US011845491B2

(12) United States Patent
Alavandi et al.

(10) Patent No.: US 11,845,491 B2
(45) Date of Patent: Dec. 19, 2023

(54) VEHICLE SUBFRAMES AND METHODS OF PRODUCING THE SAME

(71) Applicant: Ford Global Technologies, LLC, Dearborn, MI (US)

(72) Inventors: Bhimaraddi Venkaraddi Alavandi, Canton, MI (US); Harsha Kusnoorkar, Canton, MI (US); Scott J. Bell, Canton, MI (US); Vladimir Vladimirovich Bogachuk, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 279 days.

(21) Appl. No.: 17/308,726

(22) Filed: May 5, 2021

(65) Prior Publication Data

US 2022/0355865 A1 Nov. 10, 2022

(51) Int. Cl.
*B62D 21/03* (2006.01)
*B62D 65/02* (2006.01)
*B62D 21/15* (2006.01)

(52) U.S. Cl.
CPC ........... *B62D 21/03* (2013.01); *B62D 21/155* (2013.01); *B62D 65/02* (2013.01)

(58) Field of Classification Search
CPC ........ B62D 21/11; B62D 21/15; B62D 21/03; B62D 21/155; B62D 65/02
See application file for complete search history.

(56) References Cited

U.S. PATENT DOCUMENTS

| | | | | |
|---|---|---|---|---|
| 6,994,374 B2 * | 2/2006 | Miyasaka | ................ | B60G 7/02 280/784 |
| 8,596,711 B2 * | 12/2013 | Yasui | ................... | B62D 25/082 296/187.1 |
| 9,016,767 B2 * | 4/2015 | Sotoyama | ............ | B62D 21/152 296/203.02 |
| 9,233,714 B2 * | 1/2016 | Hara | ...................... | B62D 25/08 |
| 10,279,841 B2 * | 5/2019 | Ito | ......................... | B62D 21/152 |
| 10,479,409 B2 | 11/2019 | Fujiwara et al. | | |
| 10,647,361 B2 | 5/2020 | Kanamaru et al. | | |
| 10,654,525 B2 * | 5/2020 | Komiya | ................ | B62D 21/11 |
| 11,292,523 B2 * | 4/2022 | Shah | ..................... | B62D 21/152 |
| 2013/0256051 A1 * | 10/2013 | Nakamura | ........... | B62D 21/155 180/271 |
| 2018/0281863 A1 * | 10/2018 | Daikokuya | .......... | B62D 21/155 |
| 2019/0111975 A1 * | 4/2019 | Hata | ..................... | B32B 15/012 |
| 2019/0300059 A1 * | 10/2019 | Komiya | ................ | B62D 53/067 |
| 2021/0347413 A1 * | 11/2021 | Park | ..................... | B62D 25/082 |

FOREIGN PATENT DOCUMENTS

| | | | | |
|---|---|---|---|---|
| DE | 112013001681 T5 * | 1/2015 | ............. | B62D 21/11 |
| EP | 2896551 A1 * | 7/2015 | ............. | B60R 19/02 |
| JP | 6103085 | 3/2017 | | |

* cited by examiner

*Primary Examiner* — Lori Lyjak
(74) *Attorney, Agent, or Firm* — Lorne Forsythe; HANLEY, FLIGHT & ZIMMERMAN LLC

(57) ABSTRACT

Vehicle subframes and methods of producing the same are disclosed. An example apparatus includes a subframe of a vehicle including longitudinal members, and lateral extensions extending from the longitudinal members, the lateral extensions extending outward from a longitudinal centerline of the vehicle, outer edges of the lateral extensions including contours to avoid turn radii of steerable tires of the vehicle.

20 Claims, 6 Drawing Sheets

VEHICLE SUBFRAMES AND METHODS OF PRODUCING THE SAME

FIELD OF THE DISCLOSURE

This disclosure relates generally to vehicle chassis, and, more particularly, to vehicle subframes and methods of producing the same.

BACKGROUND

A vehicle frame, also referred to as a chassis, is the main supporting structure of a vehicle. Vehicle frames can be body-on-frame constructions, where the body of the vehicle is separate from the frame, or unibody constructions, where the frame and the body are integrated. The vehicle frame supports mechanical components of the vehicle and manages the static and dynamic loads on the vehicle (e.g., the weight of passengers and cargo, torsional twisting due to uneven road surfaces, torque from a vehicle engine and/or transmission, etc.). In some examples, vehicle frames include subframes. Subframes are discrete structures within the frame that support specific vehicle structures. Vehicles can absorb impacts through deformation of the subframe.

SUMMARY

Example subframes and methods of producing the same are disclosed herein. An example apparatus includes a subframe of a vehicle including longitudinal members, and lateral extensions extending from the longitudinal members, the lateral extensions extending outward from a longitudinal centerline of the vehicle, outer edges of the lateral extensions including contours to avoid turn radii of steerable tires of the vehicle.

An example subframe assembly includes a first longitudinal member, a first lateral extension coupled to the first longitudinal member, the first lateral extension to be at least partially disposed within a first outer quarter of a width of a vehicle, a portion of an outer edge of the first lateral extension facing a rear of the vehicle, a second longitudinal member, and a second lateral extension coupled to the second longitudinal member, the second lateral extension to be at least partially disposed within a second outer quarter of the width of the vehicle opposite the first outer quarter, a portion of an outer edge of the second lateral extension facing the rear of the vehicle.

An example method for assembling a subframe includes coupling a first lateral extension to an outer edge of a first longitudinal member, the first lateral extension to be at least partially disposed in a first outer quarter of a width of a vehicle, and coupling a second lateral extension to an outer edge of a second longitudinal member, the second lateral extension to be at least partially disposed in a second outer quarter of the width of the vehicle opposite the first outer quarter, a rear end of the first lateral extension and a rear end of the second lateral extension to be positioned behind a frontmost portion of tires of the vehicle in a vehicle longitudinal direction.

Figure 1:
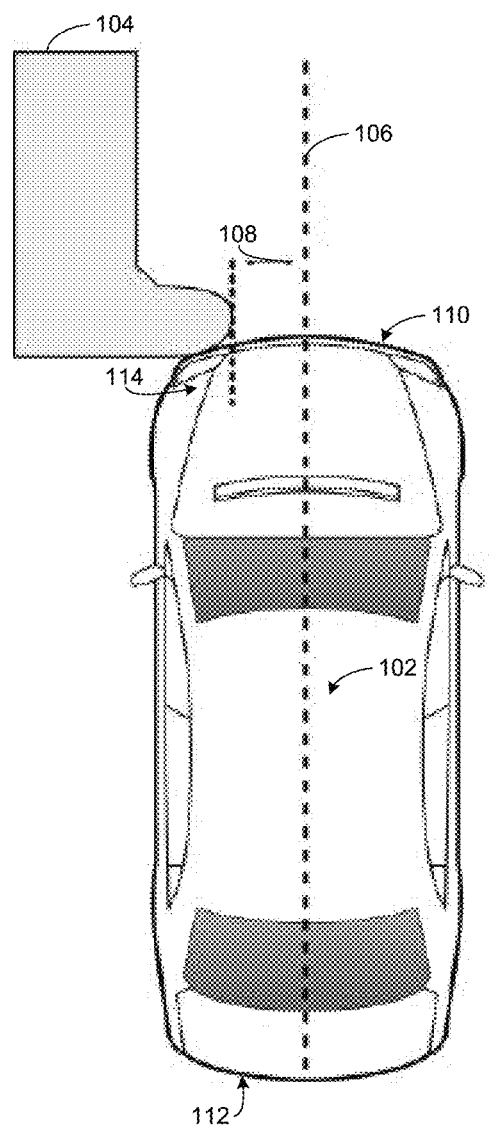
FIG. 1 illustrates an example impact event to be encountered by an example vehicle.

The figures are not to scale. In reality, the boundaries and/or lines may be unobservable, blended, and/or irregular. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Vehicle subframes and methods of producing the same are disclosed. A subframe of a vehicle provides support for vehicle components as well as protection against impact. In particular, the subframe deforms to provide impact absorption. A desirable deformation of the subframe absorbs the impact while minimizing or otherwise reducing an effect of the impact on the vehicle occupant compartment and/or other vehicle components.

In known implementations, a subframe of a vehicle typically includes a left and right longitudinal member extending in a vehicle longitudinal direction. However, while the left and right longitudinal members can absorb impact in some frontal collisions, the longitudinal members typically do not extend across more than half of a vehicle width. As such, when the impact occurs outside the width of the longitudinal members less of the impact can be absorbed by the longitudinal members. To ensure the vehicle sufficiently protects the occupant compartment, the Insurance Institute of Highway Safety (IIHS) performs a Small Overlap Impact (SOI) test where a front of the vehicle encounters impact from a specially shaped rigid wall that overlaps an outer quarter of the width of the vehicle.

Examples disclosed herein include subframes that cause vehicles to glide-by a frontal impact at an outer portion of the vehicle to minimize or otherwise reduce an effect of the impact on the vehicle occupant compartment. An example subframe (e.g., a subframe assembly, a front subframe, etc.)

includes longitudinal members extending in a vehicle longitudinal direction on opposite sides of a longitudinal centerline of the vehicle. Lateral extensions (e.g., subframe extensions, flared portions of the longitudinal members, etc.) are positioned at a front portion of the longitudinal members and extend outward from the longitudinal centerline of the vehicle. In particular, the lateral extensions can extend more than 165 millimeters (mm) into opposite outer quarters of the width of the vehicle. Accordingly, the lateral extensions can absorb a load when a frontal impact occurs at the outer portions of the vehicle.

In examples disclosed herein, each of the lateral extensions is fixed to a respective one of the longitudinal members at a first point of the vehicle and a second point of the vehicle in a vehicle longitudinal direction. Specifically, the first point of the vehicle is positioned at a first distance from a front of the vehicle and the second point is positioned at a second distance from the front of the vehicle that is greater than the first distance. Further, a frontmost portion of steerable tires of the vehicle is positioned at a third distance from the front of the vehicle between the first distance and the second distance. As such, portions of the lateral extensions are adjacent to tires of the vehicle.

In examples disclosed herein, outer edges of the lateral extensions include contours to avoid turn radii of the steerable tires. That is, the contours of the outer edges of the lateral extensions are shaped to avoid a space occupied by the steerable tires at any maneuverable angular orientation thereof. As such, the contours prevent contact with steerable tires to avoid impacting a maneuverability of the vehicle. In some examples, the contours include a first shape between the front end of the lateral extensions and the frontmost portion of the tires. In some examples, the contours include a second shape different from the first shape between the frontmost portion of the tires and the rear end of the lateral extensions. Accordingly, the lateral extensions extend from a front of the subframe past the frontmost portion of the front tires to engage the longitudinal members both in front of and behind the frontmost portion of the front tires in the vehicle longitudinal direction.

In some examples, portions of the outer edges of the lateral extensions face a rear of the vehicle to provide sufficient clearance for the turn radii of the tires while also allowing significant portions of the lateral extensions to extend into the outer quarters of the width of the vehicle. As such, increased portions of the lateral extensions can be positioned in the outer quarters of the width of the vehicle to enable more impact absorption. Specifically, the lateral extensions structurally deform in response to encountering an impact and, thus, absorb at least a portion of the impact. Further, the engagement between the lateral extensions and the longitudinal members enables the lateral extension to transfer a load laterally onto the associated longitudinal member in response to encountering an impact force. As a result, the lateral force increases the lateral velocity of the vehicle, which reduces a longitudinal deceleration and enables a partial glide-by of the vehicle past the impacting object. Accordingly, a penetration of the impact in the vehicle longitudinal direction is reduced, which reduces an effect of the impact on an occupant compartment of the vehicle.

In some examples, the subframe includes a cross-member coupled to the longitudinal members. In such examples, a front side of the cross-member (e.g., a side of the cross-member facing the front of the vehicle) is positioned closer to a front of the vehicle than rear ends of the lateral extensions positioned at the second point of the vehicle. Further, a rear side of the cross-member (e.g., a side of the cross-member facing the rear of the vehicle) is positioned further from the front of the vehicle than the rear ends of the lateral extensions. Accordingly, at least a portion of the cross-member is disposed behind the frontmost portion of the front tires in the vehicle longitudinal direction. In some examples, a midsection of the cross-member between the front side and the rear side aligns with the rear ends of the lateral extensions along a plane orthogonal to the longitudinal centerline of the vehicle.

In examples disclosed herein, the cross-member enables an increased lateral deflection and, thus, impact absorption when one of the lateral extensions is subjected to an impact. Specifically, the position of the cross-member reduces movement of the rear end of the lateral extension and, in turn, causes the lateral extension and the longitudinal member to experience more deformation instead of movement, which absorbs more force from the impact. Further, the cross-member transfers the absorbed force laterally and, thus, increases the lateral velocity of the vehicle. In turn, the longitudinal deceleration in response to the impact is further reduced as a greater portion of the vehicle avoids being penetrated by the object as the vehicle moves laterally away from the object, which allows the vehicle to glide-by the impacting object. As a result, the effect of the impact on the vehicle occupant compartment is minimized or otherwise reduced.

FIG. 1 illustrates an example impact event 100 to be encountered by a vehicle 102. The illustrated example of FIG. 1 is representative of the IIHS SOI test. In the illustrated example of FIG. 1, an object 104 is to impact a portion of the vehicle 102. Specifically, the object 104 is separated from a longitudinal centerline 106 of the vehicle 102 by a quarter width 108 of the vehicle 102. The longitudinal centerline 106 extends between a front 110 and a rear 112 of the vehicle 102 splitting a width of the vehicle into two halves. As such, the object 104 overlaps an outer quarter (e.g., outer 25%) width 114 of the vehicle 102.

Figure 2:
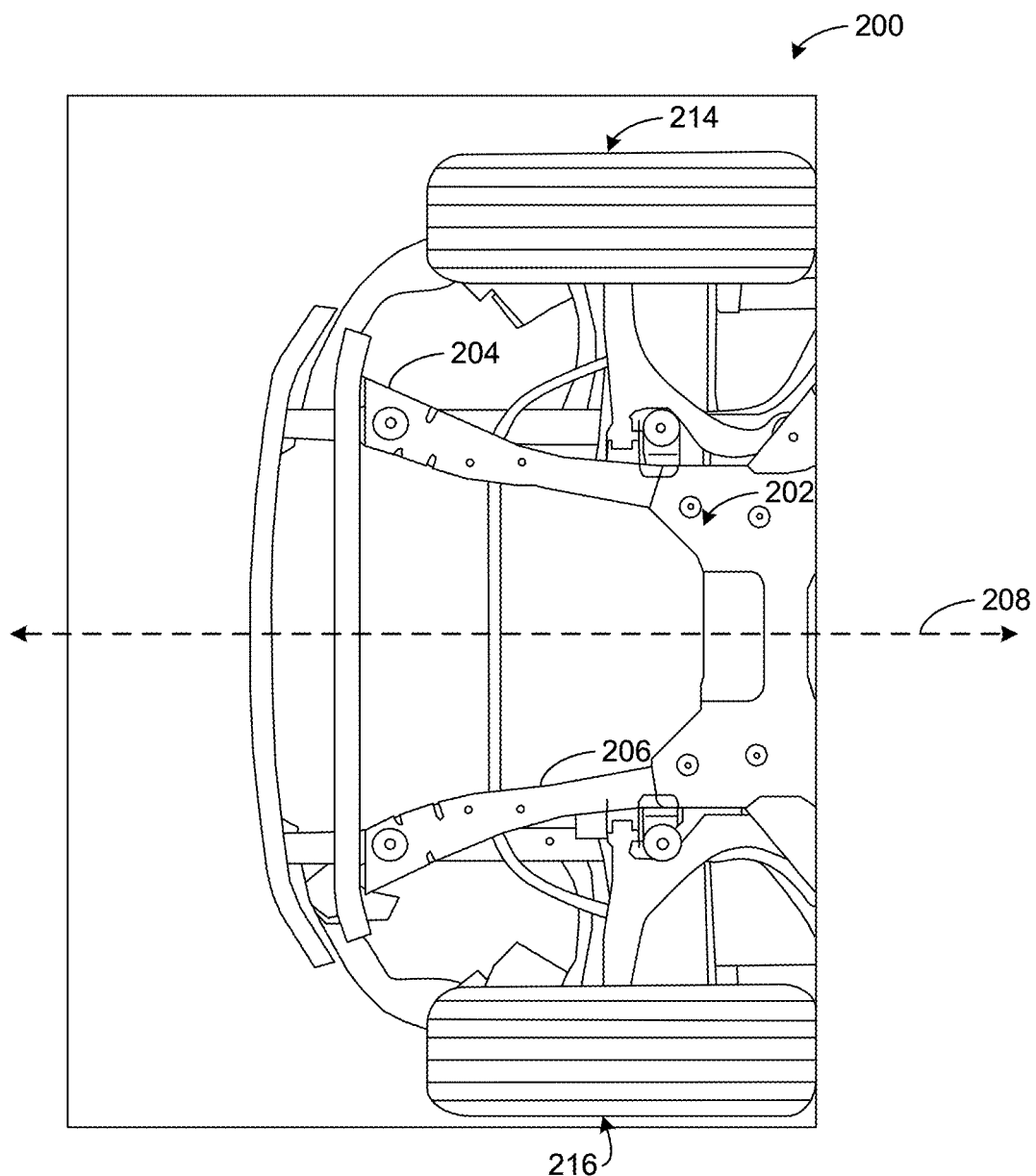
FIG. 2 illustrates a prior art subframe that may be utilized by the example vehicle of FIG. 1.

FIG. 2 illustrates a front portion of a first vehicle (e.g., the vehicle 102) 200 including a prior art subframe 202. In the illustrated example of FIG. 2, the prior art subframe 202 includes a first longitudinal member 204 and a second longitudinal member 206 disposed on opposites side of a longitudinal centerline (e.g., the longitudinal centerline 106) 208 of the first vehicle 200. In FIG. 2, the first vehicle 200 further includes a first front tire 214 and a second front tire 216 disposed on opposite sides of the longitudinal centerline 208.

Figure 3:
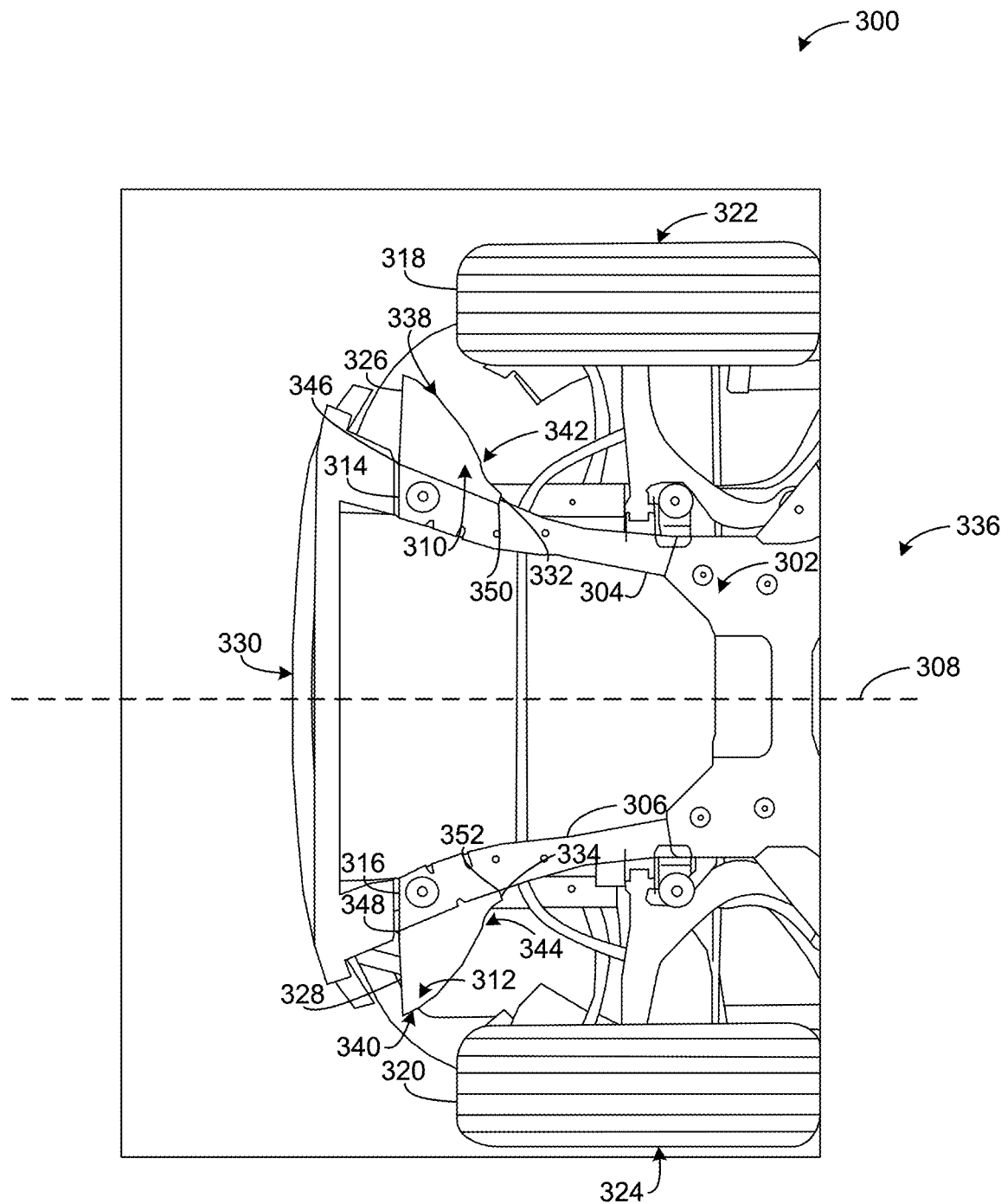
FIG. 3 illustrates a first example subframe that may be utilized by the example vehicle of FIG. 1.

FIG. 3 illustrates a front portion of a second vehicle (e.g., the vehicle 102) 300 including a first example subframe 302 in accordance with the teachings disclosed herein. In the illustrated example of FIG. 3, the first subframe 302 includes a first longitudinal member 304 and a second longitudinal member 306 disposed on opposite sides of a longitudinal centerline (e.g., the longitudinal centerline 106) 308.

In FIG. 3, the first subframe 302 includes a first lateral extension 310 extending from the first longitudinal member 304 and a second lateral extension 312 extending from the second longitudinal member 306. In particular, the first lateral extension 310 and the second lateral extension 312 extend outward away from the longitudinal centerline 308. In some examples, the first lateral extension 310 and the second lateral extension 312 are coupled to the first longitudinal member 304 and the second longitudinal member 306, respectively, via welding and/or bolts.

In the illustrated example of FIG. 3, the first lateral extension 310 is at least partially disposed within a first outer quarter of a width of the second vehicle 300. Similarly, the second lateral extensions 312 is at least partially disposed within a second outer quarter of the width of the second vehicle 300 on an opposite side of the longitudinal centerline 308 from the first outer quarter of the width. In FIG. 3, the first lateral extension 310 and the second lateral extension 312 define an outermost width of the first subframe 302. In FIG. 3, the lateral extensions 310, 312 extend from ends (e.g., front ends) 314, 316 of the longitudinal members 304, 306 past frontmost portions 318, 320 of tires 322, 324 of the second vehicle 300 in a direction defined by the longitudinal centerline 308 (i.e., in a vehicle longitudinal direction). That is, the front ends 326, 328 of the lateral extensions 310, 312 are positioned closer to a front 330 of the second vehicle 300 than the frontmost portions 318, 320 of the tires 322, 324 while rear ends 332, 334 of the lateral extensions 310, 312 are positioned closer to a rear 336 of the second vehicle 300 than the frontmost portions 318, 320 of the tires 322, 324. As such, portions of the first and second lateral extensions 310, 312 are adjacent to the tires 322, 324.

In the illustrated example of FIG. 3, outer edges (e.g., outer sidewalls) 338, 340 of the first lateral extension 310 and the second lateral extension 312 include contours extending between the front ends 326, 328 and the rear ends 332, 334 of the lateral extensions 310, 312. In some examples, portions 342, 344 of the contours are rearward facing (i.e., face the rear 336 of the vehicle 300). In particular, the contours enable the lateral extensions 310, 312 to extend past the frontmost portion 318, 320 of the tires 322, 324 while avoiding turn radii of the tires 322, 324. As such, the lateral extensions 310, 312 avoid interfering with a maneuverability of the second vehicle 300 while having a contact area with the longitudinal members 304, 306 that extends from the front ends 314, 316 past the frontmost portions 318, 320 of the tires 322, 324.

In some examples, the object 104 impacts the front 330 of the second vehicle 300 and encounters the first lateral extension 310 or the second lateral extension 312. In FIG. 3, the contact area between the lateral extensions 310, 312 and the longitudinal members 304, 306 enables the lateral extensions 310, 312 to transfer a significant load onto the longitudinal members 304, 306 in response to encountering an impact. In turn, when the object 104 impacts an outer portion of the width of the vehicle 300, the first lateral extension 310 or the second lateral extension 312 exerts a reactive force against the impacting object 104 and is supported by the longitudinal member 304, which causes the vehicle 300 to deflect in the vehicle lateral direction 313. Further, the impact causes the first or second lateral extension 310, 312 and the associated longitudinal member 304, 306 to deform and, thus, absorb a portion of the force encountered during the impact. As a result, the absorption of the impact by the first subframe 302 and the lateral deflection of the vehicle 300 reduces a penetration of the object 104 in the vehicle longitudinal direction. Specifically, the lateral deflection of the vehicle 300 positions the object 104 substantially outside a width of an occupant compartment between the subframe 302 and the rear 336 of the vehicle 300 and, thus, intrusion into the occupant compartment is minimized or otherwise reduced. In some examples, the lateral deflection of the vehicle 300 enables the vehicle 300 to partially maintain a velocity in the vehicle longitudinal direction and, in turn, the vehicle 300 can partially glide by the object 104 after impact.

In FIG. 3, the front end 326, 328 of the lateral extensions 310, 312 are in connection with the longitudinal members 304, 306 at first point 346, 348 positioned a first distance away from the longitudinal centerline 308. Further, the rear ends 332, 334 of the lateral extensions 310, 312 are in connection with the longitudinal members 304, 306 at second points 350, 352 positioned a second distance away from the longitudinal centerline 308 less than the first distance.

Figure 4:
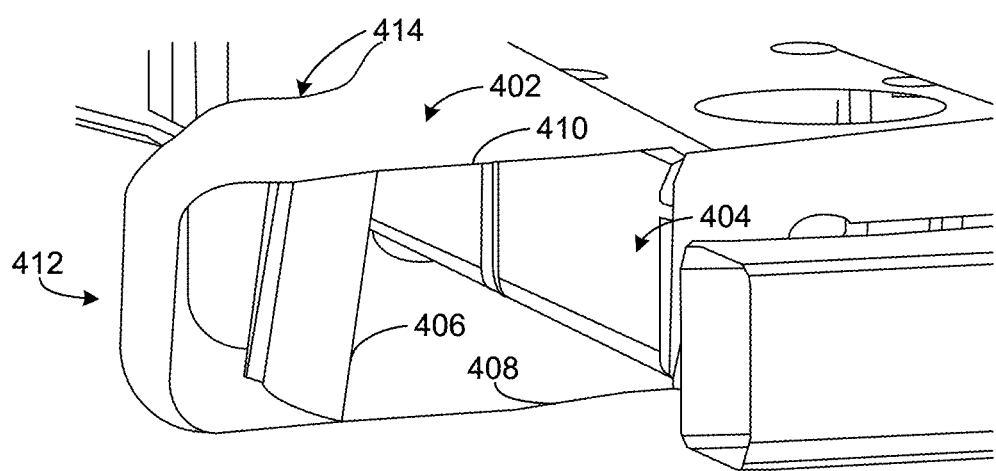
FIG. 4 illustrates a partial cross-sectional view of an example lateral extension of the first example subframe of FIG. 3.
Figure 5:
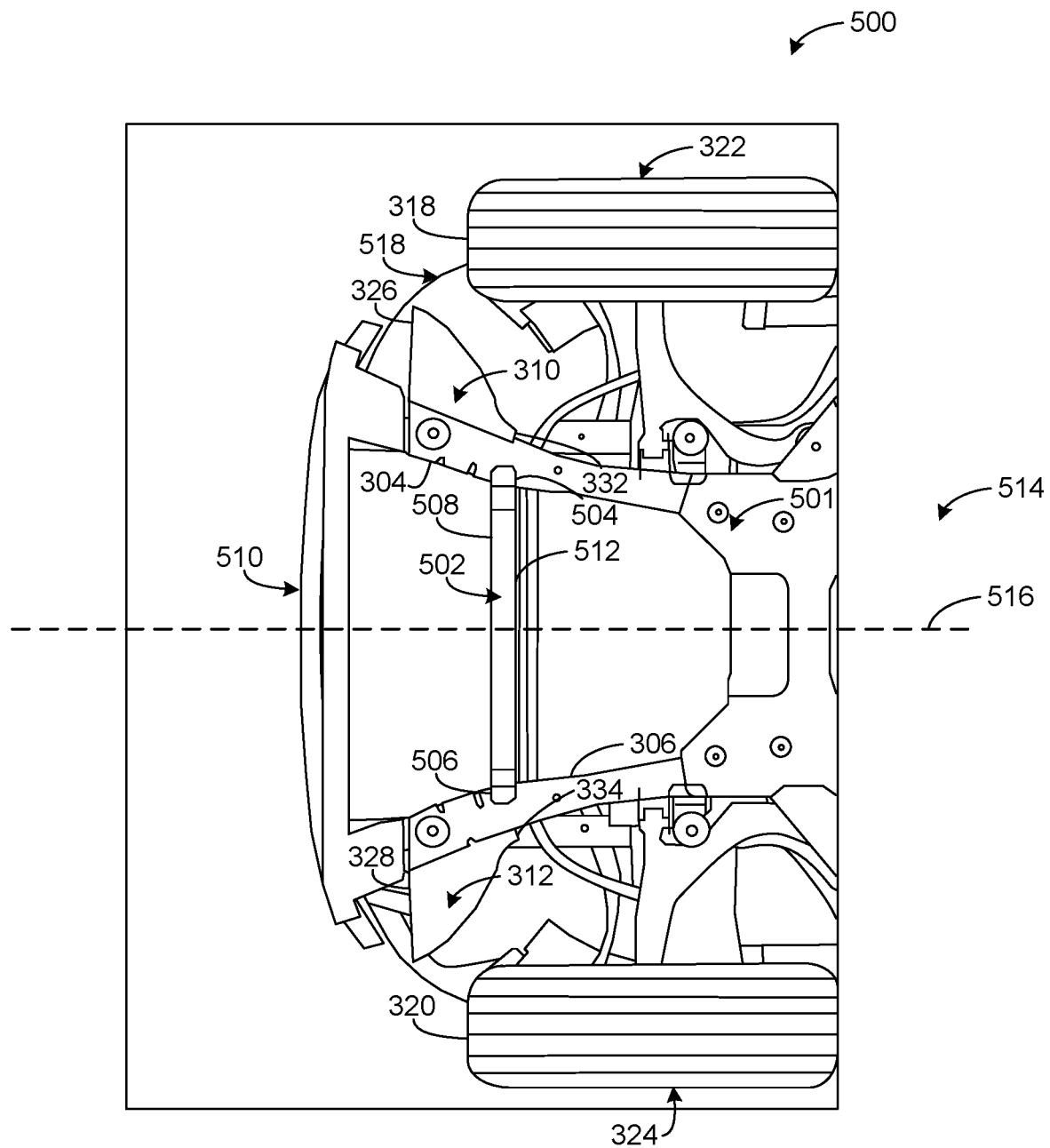
FIG. 5 illustrates a second example subframe that may be utilized by the example vehicle of FIG. 1.

Turning to FIG. 4, a partial cross-sectional view of a front end (e.g., the front end 326, the front end 328) of an example lateral extension (e.g., the first lateral extension 310, the second lateral extension 312) 402 is illustrated. In the illustrated example of FIG. 4, an interior of the lateral extension 402 includes a cavity 404. In FIG. 5, the lateral extension 402 further includes a plate 406 fixed between a first side 408 of the cavity 404 and a second side 410 of the cavity 404. In some examples, the plate 406 provides structural reinforcement for the first lateral extension 310. In some other examples, the first lateral extension 310 does not include the plate 406.

In the illustrated example of FIG. 4, an outer edge 412 of the lateral extension 402 includes a contour to prevent contact with a steerable tire (e.g., the tires 322, 324) of a vehicle (e.g., the vehicle 300). In FIG. 4, a portion 414 of the lateral extension 402 is rearward facing to avoid the turn radii of the steerable tire. In some examples, the outer edge 412 includes curvature in more than one geometric plane. The lateral extension 402 can include a same material as the longitudinal members 304, 306 or a different material. For example, the lateral extension 402 can include metal, hard plastic, or fiber reinforced composite.

FIG. 5 illustrates a front portion of a third vehicle (e.g., the vehicle 102) 500 including a second example subframe 501 in accordance with the teachings disclosed herein. In the illustrated example of FIG. 5, the second subframe 501 includes the first longitudinal member 304, the second longitudinal member 306, the first lateral extension 310, and the second lateral extension 312, as described in association with FIG. 3. In FIG. 5, the second subframe 501 further includes a cross-member 502.

In FIG. 5, a first end 504 of the cross-member 502 is coupled to the first longitudinal member 304 and a second end 506 of the cross-member 502 is coupled to the second longitudinal member 306. In some examples, the cross-member 502 is coupled to the longitudinal members 304, 306 via bolts and/or welding. The cross-member 502 can include a same material as the longitudinal members 304, 306 or a different material. For example, the cross-member 502 can include metal, hard plastic, or a fiber reinforced composite.

In FIG. 5, a first side 508 of the cross-member 502 faces a front 510 of the third vehicle 500 and a second side 512 of the cross-member 502 faces a rear 514 of the third vehicle 500. In FIG. 5, the first side 508 of the cross-member 502 is positioned closer to the front 510 of the third vehicle 500 than the rear ends 332, 334 of the lateral extensions 310, 312 in the vehicle longitudinal direction. Further, the second side 512 of the cross-member 502 is positioned closer to the rear 514 of the third vehicle 500 than the rear ends 332, 334 of the lateral extensions 310, 312 in the vehicle longitudinal direction. In some examples, a midsection of the cross-member 502 between the first side 508 and the second side 512 aligns with the rear ends 332, 334 of the lateral extensions 310, 312 along a plane orthogonal to a longitudinal centerline 516 of the third vehicle 500.

In some examples, when the object 104 impacts the front 510 of the third vehicle 500 and encounters the first lateral extension 310, the first lateral extension 310 exerts a reactive force against the impacting object 104 while deforming to absorb the impact. In some examples, the cross-member 502 helps maintain a relative position of the rear end 332 of the first lateral extension 310 and, thus, enables the first lateral extension 310 and the longitudinal member 304 to absorb a greater magnitude of the impact via deformation as opposed to being deflected away from the object 104 in response to the impact. In addition, the cross-member 502 transfers the load encountered by the first lateral extension 310 and/or the longitudinal member 304 laterally, which causes the vehicle 500 to deflect laterally away from the object 104 with an increased velocity. In turn, the lateral deflection of the vehicle 500 minimizes or otherwise reduces a penetration of the impacting object 104 in the vehicle longitudinal direction.

In some examples, the vehicle 500 deflects such that the impacting object 104 is positioned outside a width of a body 518 of the vehicle 500 after impacting the lateral extension 310. In addition to limiting the intrusion of the object 104, the separation between the body 518 of the vehicle 500 and the object 104 enables the vehicle 500 to partially maintain a velocity thereof in the vehicle longitudinal direction and, as a result, the vehicle 500 can glide by the object 104. As such, a magnitude of the deceleration of the vehicle 500 is reduced, which minimizes or otherwise reduces an effect of the impact event 100 on vehicle occupants.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 6:
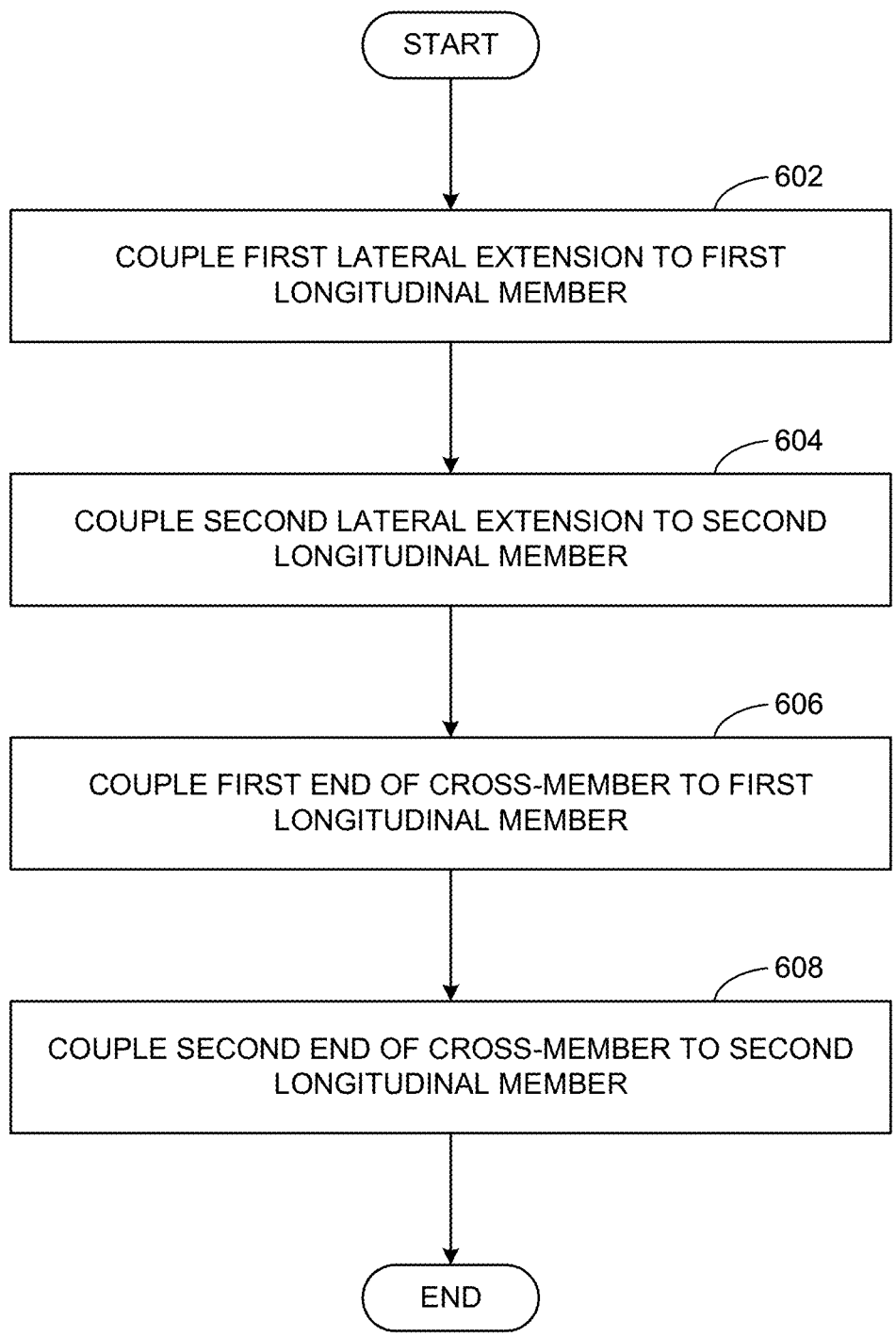
FIG. 6 is a flowchart representative of an example method to produce the first and/or second example subframes of FIGS. 3 and/or 6.

FIG. 6 is a flowchart representative of an example method 600 to produce the first and/or second example subframes 302, 501 of FIGS. 3 and/or 5. At block 602, the first lateral extension 310 is coupled to the first longitudinal member 304. For example, the first lateral extension 310 can be coupled to an outer edge of the first longitudinal member 304. In some examples, the first lateral extension 310 is coupled to the front end 314 of the first longitudinal member 304 via welding and/or bolts.

At block 604, the second lateral extension 312 is coupled to the second longitudinal member 306. For example, the second lateral extension 312 can be coupled to an outer edge of the second longitudinal member 306. In some examples, the second lateral extension 312 is coupled to the front end 316 of the second longitudinal member via welding and/or bolts.

At block 606, the first end 504 of the cross-member 502 is coupled to the first longitudinal member 304. For example, the first end 504 of the cross-member 502 can be coupled to the first longitudinal member 304 via welding and/or bolts. In some examples, the first side 508 of the cross-member 502 is aligned with a portion of the first lateral extension 310 in a plane orthogonal to the longitudinal centerline 516 of the vehicle 500. In some examples, the second side 512 of the cross-member 502 is not aligned with the first lateral extension 310 in a plane orthogonal to the longitudinal centerline 516 of the vehicle 500. That is, the first side 508 of the cross-member 502 is disposed in front of the rear end 332 of the first lateral extension 310 in the vehicle longitudinal direction and the second side 512 of the cross-member 502 is disposed behind the rear end 332 of the first lateral extension 310 in the vehicle longitudinal direction.

At block 608, the second end 506 of the cross-member is coupled to the second longitudinal member 306. For example, the second end 506 of the cross-member 502 can be coupled to the second longitudinal member 306 via welding and/or bolts. In some examples, the cross-member is disposed behind the frontmost portions 318, 320 of the tires 322, 324.

From the foregoing, it will be appreciated that example methods, apparatus and articles of manufacture have been disclosed that increase impact absorption in response to a frontal impact that partially overlaps a width of a vehicle. As a result, intrusion of the impacting object through the front of the vehicle is minimized or otherwise reduced, which prevents the impacting object from penetrating, or causing vehicle components to penetrate, the vehicle occupant compartment. Specifically, lateral extensions expand a width of the subframe, which allows the subframe to provide increased impact absorption for impact events that occur at an outer portion of the vehicle width. A size of the lateral extensions also maximizes or otherwise increases a contact area with an associated longitudinal member of the subframe, which allows a greater magnitude of the impact force to be transferred thereto. Further, a cross-member in connection with the longitudinal members enables the impact force to be transferred laterally, which allows the vehicle to move away from the impacting object. As a result, the vehicle can separate from the object and glide by the impact, which eliminates or otherwise reduces intrusion into a vehicle occupant compartment caused by the object or vehicle components in response to the impact. In addition, a position of the cross-member helps maintain a position of the longitudinal member and, in turn, a position of the rear ends of the lateral extensions. As a result, the cross-member enables the longitudinal member and the lateral extensions to incur greater deformation in response to the impact without moving away from the impacting object, which maximizes or otherwise increases a magnitude of the impact absorption provided thereby.

Example vehicle subframes and methods of producing the same are disclosed herein. Further examples and combinations thereof include the following:

Example 1 includes an apparatus comprising a subframe of a vehicle including longitudinal members, and lateral extensions extending from the longitudinal members, the lateral extensions extending outward from a longitudinal centerline of the vehicle, outer edges of the lateral extensions including contours to avoid turn radii of steerable tires of the vehicle.

Example 2 includes the apparatus of example 1, wherein a portion of the contours of the outer edges of the lateral extensions faces a rear of the vehicle.

Example 3 includes the apparatus of example 1, wherein each of the lateral extensions is fixed to a respective one of the longitudinal members at a first point of the vehicle and a second point of the vehicle in a vehicle longitudinal direction, the first point positioned at a first distance from a front of the vehicle, the second point positioned at a second distance from the front of the vehicle that is greater than the first distance, a frontmost portion of the steerable tires of the vehicle positioned at a third distance from the front of the vehicle, the third distance between the first distance and the second distance, the contours including a first shape between the first distance and the second distance and a second shape different from the first shape between the second distance and the third distance.

Example 4 includes the apparatus of example 1, further including a cross-member coupled to the longitudinal members of the subframe.

Example 5 includes the apparatus of example 4, wherein a front side of the cross-member is positioned closer to a front of the vehicle than rear ends of the lateral extensions, and a rear side of the cross-member is positioned further from the front of the vehicle than the rear ends of the lateral extensions.

Example 6 includes the apparatus of example 1, wherein the outer edges of the lateral extensions include curvature in more than one geometric plane.

Example 7 includes the apparatus of example 1, wherein the lateral extensions extend at least 165 millimeters into opposite outer quarters of a width of the vehicle.

Example 8 includes a subframe assembly comprising a first longitudinal member, a first lateral extension coupled to the first longitudinal member, the first lateral extension to be at least partially disposed within a first outer quarter of a width of a vehicle, a portion of an outer edge the first lateral extension facing a rear of the vehicle, a second longitudinal member, and a second lateral extension coupled to the second longitudinal member, the second lateral extension to be at least partially disposed within a second outer quarter of the width of the vehicle opposite the first outer quarter, a portion of an outer edge the second lateral extension facing the rear of the vehicle.

Example 9 includes the subframe assembly of example 8, wherein a first portion of the first lateral extension and a first portion of the second lateral extension are disposed adjacent to tires of the vehicle.

Example 10 includes the subframe assembly of example 9, wherein a second portion of the first lateral extension and a second portion of the second lateral extension are disposed in front of the first portion of the first lateral extension and the first portion of the second lateral extension in a vehicle longitudinal direction, the second portion of the first lateral extension and the second portion of the second lateral extension including contours to prevent contact with steerable tires of the vehicle.

Example 11 includes the subframe assembly of example 8, wherein at least one of an interior of the first lateral extension or an interior of the second lateral extension includes a cavity.

Example 12 includes the subframe assembly of example 11, further including a plate fixed to a first side of the cavity and a second side of the cavity, the plate to structurally reinforce the first lateral extension.

Example 13 includes the subframe assembly of example 8, further including a cross-member coupled to the first longitudinal member and the second longitudinal member.

Example 14 includes the subframe assembly of example 13, wherein the cross-member is disposed behind a front of tires of the vehicle in a vehicle longitudinal direction.

Example 15 includes the subframe assembly of example 8, wherein the outer edge of the first lateral extension and the outer edge of the second lateral extension include curvature in more than one geometric plane.

Example 16 includes a method for assembling a subframe, the method comprising coupling a first lateral extension to an outer edge of a first longitudinal member, the first lateral extension to be at least partially disposed in a first outer quarter of a width of a vehicle, and coupling a second lateral extension to an outer edge of a second longitudinal member, the second lateral extension to be at least partially disposed in a second outer quarter of the width of the vehicle opposite the first outer quarter, a rear end of the first lateral extension and a rear end of the second lateral extension to be positioned behind a frontmost portion of tires of the vehicle in a vehicle longitudinal direction.

Example 17 includes the method of example 16, further including coupling a first end of a cross-member to the first longitudinal member, and coupling a second end of the cross-member to the second longitudinal member, the cross-member to be disposed behind the frontmost portion of the tires of the vehicle.

Example 18 includes the method of example 16, wherein an outer sidewall of the first lateral extension and an outer sidewall of the second lateral extension include contours to avoid turn radii of the tires.

Example 19 includes the method of example 16, wherein an outer sidewall of the first lateral extension and an outer sidewall of the second lateral extension include a rearward facing portion.

Example 20 includes the method of example 16, wherein a front end and a rear end of the first lateral extension is fixed to the first longitudinal member, the front end positioned a first distance from a longitudinal centerline of the vehicle, the rear end positioned a second distance from the longitudinal centerline of the vehicle less than the first distance.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    a subframe of a vehicle including longitudinal members; and
    lateral extensions extending from the longitudinal members, the lateral extensions extending outward from a longitudinal centerline of the vehicle, outer edges of the lateral extensions including contours to avoid turn radii of steerable tires of the vehicle, the respective lateral extensions including a cavity defined between (i) the respective outer edge of the lateral extension, (ii) the respective longitudinal member from which the lateral extension extends, (iii) a first side of the respective lateral extension that extends from the respective outer edge to the respective longitudinal member, and (iv) a second side of the respective lateral extension that extends from the respective outer edge to the respective longitudinal member on an opposite side of the cavity from the first side, the respective lateral extensions including a plate positioned in the cavity and fixed to the sides.

2. The apparatus of claim 1, wherein a portion of the contours of the outer edges of the lateral extensions faces a rear of the vehicle.

3. The apparatus of claim 1, wherein each of the lateral extensions is fixed to a respective one of the longitudinal members at a first point of the vehicle and a second point of the vehicle in a vehicle longitudinal direction, the first point positioned at a first distance from a front of the vehicle, the second point positioned at a second distance from the front of the vehicle that is greater than the first distance, a frontmost portion of the steerable tires of the vehicle positioned at a third distance from the front of the vehicle, the third distance between the first distance and the second distance, the contours including a first shape between the first distance and the second distance and a second shape different from the first shape between the second distance and the third distance.

4. The apparatus of claim 1, further including a cross-member coupled to the longitudinal members of the subframe.

5. The apparatus of claim 4, wherein a front side of the cross-member is positioned closer to a front of the vehicle than rear ends of the lateral extensions, and a rear side of the cross-member is positioned further from the front of the vehicle than the rear ends of the lateral extensions.

6. The apparatus of claim 1, wherein the outer edges of the lateral extensions include curvature in more than one geometric plane.

7. The apparatus of claim 1, wherein the lateral extensions extend at least 165 millimeters into opposite outer quarters of a width of the vehicle.

8. A subframe assembly comprising:
    a first longitudinal member;
    a first lateral extension coupled to the first longitudinal member, the first lateral extension to be at least partially disposed within a first outer quarter of a width of a vehicle, a portion of an outer edge the first lateral extension facing a rear of the vehicle;
    a second longitudinal member;
    a second lateral extension coupled to the second longitudinal member, the second lateral extension to be at least partially disposed within a second outer quarter of the width of the vehicle opposite the first outer quarter, a portion of an outer edge the second lateral extension facing the rear of the vehicle; and
    a cross-member including a first end coupled to the first longitudinal member, a second end coupled to the second longitudinal member, and a rear side extending between the first end and the second end, the rear side positioned closer than rear ends of the first and second lateral extensions to the rear of the vehicle at the first and second ends in a vehicle longitudinal direction.

9. The subframe assembly of claim 8, wherein a first portion of the first lateral extension and a first portion of the second lateral extension are disposed adjacent to tires of the vehicle.

10. The subframe assembly of claim 9, wherein a second portion of the first lateral extension and a second portion of the second lateral extension are disposed in front of the first portion of the first lateral extension and the first portion of the second lateral extension in a vehicle longitudinal direction, the second portion of the first lateral extension and the second portion of the second lateral extension including contours to prevent contact with steerable tires of the vehicle.

11. The subframe assembly of claim 8, wherein at least one of an interior of the first lateral extension or an interior of the second lateral extension includes a cavity.

12. The subframe assembly of claim 11, further including a plate fixed to a first side of the cavity and a second side of the cavity, the plate to structurally reinforce the first lateral extension.

13. The subframe assembly of claim 8, further including a cross-member coupled to the first longitudinal member and the second longitudinal member.

14. The subframe assembly of claim 13, wherein the cross-member is disposed behind a frontmost portion of tires of the vehicle in a vehicle longitudinal direction.

15. The subframe assembly of claim 8, wherein the outer edge of the first lateral extension and the outer edge of the second lateral extension include curvature in more than one geometric plane.

16. A method for assembling a subframe, the method comprising:
    coupling a first lateral extension to an outer edge of a first longitudinal member, the first lateral extension to be at least partially disposed in a first outer quarter of a width of a vehicle; and
    coupling a second lateral extension to an outer edge of a second longitudinal member, the second lateral extension to be at least partially disposed in a second outer quarter of the width of the vehicle opposite the first outer quarter, a rear end of the first lateral extension and a rear end of the second lateral extension to be positioned behind a frontmost portion of tires of the vehicle in a vehicle longitudinal direction.

17. The method of claim 16, further including:
    coupling a first end of a cross-member to the first longitudinal member; and
    coupling a second end of the cross-member to the second longitudinal member, the cross-member to be disposed behind the frontmost portion of the tires of the vehicle.

18. The method of claim 16, wherein an outer sidewall of the first lateral extension and an outer sidewall of the second lateral extension include contours to avoid turn radii of the tires.

19. The method of claim 16, wherein an outer sidewall of the first lateral extension and an outer sidewall of the second lateral extension include a rearward facing portion.

20. The method of claim 16, wherein a front end and a rear end of the first lateral extension is fixed to the first longitudinal member, the front end positioned a first distance from a longitudinal centerline of the vehicle, the rear end positioned a second distance from the longitudinal centerline of the vehicle less than the first distance.

* * * * *

UNITED STATES PATENT AND TRADEMARK OFFICE
CERTIFICATE OF CORRECTION

| | |
|---|---|
| PATENT NO. | : 11,845,491 B2 |
| APPLICATION NO. | : 17/308726 |
| DATED | : December 19, 2023 |
| INVENTOR(S) | : Alavandi et al. |

It is certified that error appears in the above-identified patent and that said Letters Patent is hereby corrected as shown below:

In the Drawings

On Page 2, Figure "1", insert reference label --"100"--.

On Page 7, Figure "6", insert reference label --"600"--.

Signed and Sealed this
Sixth Day of February, 2024

Katherine Kelly Vidal
*Director of the United States Patent and Trademark Office*